United States Patent
Jeong et al.

(10) Patent No.: US 7,256,919 B1
(45) Date of Patent: Aug. 14, 2007

(54) ROTATIONAL MICRO MIRROR

(75) Inventors: Hee-Moon Jeong, Yongin-si (KR); Jin-ho Lee, Suwon-si (KR); Jin-woo Cho, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/408,049

(22) Filed: Apr. 21, 2006

(30) Foreign Application Priority Data

Jan. 20, 2006 (KR) .................. 10-2006-0006273

(51) Int. Cl.
*G02B 26/08* (2006.01)

(52) U.S. Cl. .................. 359/226; 359/224; 359/225; 359/196

(58) Field of Classification Search ........ 359/196–198, 359/290–291, 295, 298, 224–226
See application file for complete search history.

(56) References Cited

U.S. PATENT DOCUMENTS

| | | | |
|---|---|---|---|
| 6,774,445 B2 * | 8/2004 | Mutoh et al. ............... | 257/415 |
| 6,914,710 B1 * | 7/2005 | Novotny et al. ............ | 359/291 |
| 6,995,495 B2 * | 2/2006 | Ko et al. .................... | 310/309 |
| 2003/0007262 A1 * | 1/2003 | Tsuboi et al. ............... | 359/847 |

* cited by examiner

*Primary Examiner*—Scott J. Sugarman
*Assistant Examiner*—DaWayne A. Pinkney
(74) *Attorney, Agent, or Firm*—Sughrue Mion, PLLC

(57) ABSTRACT

A rotational micro mirror is rapidly driven, has a large driving angle, and is structurally stable. The rotational micro mirror includes: a substrate; a reflection plate which is rotatable and reflects light; a pair of torsion springs which support opposite ends of the reflection plate so that the reflection plate is raised from the substrate, and acting as a rotation axis when the reflection plate is rotationally driven; a pair of frames which are connected to the reflection plate without connecting to the torsion springs and are symmetrically formed with respect to the torsion springs; frame supporting units which connect the reflection plate and the frames; and a driving unit including moving combs disposed on the frames and static combs disposed on the substrate and respectively corresponding to the moving combs in order to generate an electrostatic force.

14 Claims, 4 Drawing Sheets

ROTATIONAL MICRO MIRROR

CROSS-REFERENCE TO RELATED PATENT APPLICATION

This application claims priority from Korean Patent Application No. 10-2006-0006273, filed on Jan. 20, 2006, in the Korean Intellectual Property Office, the disclosure of which is incorporated herein in its entirety by reference.

BACKGROUND OF THE INVENTION

1. Field of the Invention

The present invention relates to a rotational micro mirror and, more particularly, to a micro mirror used for scanning a laser beam in a display device such as a laser TV, and a method of manufacturing the same.

2. Description of the Related Art

With the advances of the multimedia era, large screen displays are increasingly demanded, and accordingly, various kinds of large screen display devices have been developed. A laser TV has been suggested as a next-generation display device because of inexpensive manufacturing costs and the possibility of manufacturing it with a large screen that displays high resolution images.

The laser TV includes a light scanner which scans horizontally and vertically laser beams radiating from laser diode modules according to red-green-blue (RGB) image signals. A micro mirror manufactured using a micro-electro mechanical system (MEMS) is used for the light scanner.

FIGS. 1A and 1B are plan views of conventional micro mirrors. FIG. 2 illustrates the operation of the micro mirrors of FIGS. 1A and 1B.

Referring to FIGS. 1A and 1B, the micro mirror includes a rotatable mirror unit 1, a pair of spring units 2 and 2' connected to opposite ends of the mirror unit 1 to support the mirror unit 1 and act as a rotation axis when the mirror unit 1 rotates, and moving combs 3 and static combs 4 forming a driving unit which rotates the mirror unit 1.

The moving combs 3 and static combs 4 respectively include a plurality of comb-fingers. The moving combs 3 may be installed in the mirror unit 1 as illustrated in FIG. 1A or in spring units 2 and 2' as illustrated in FIG. 1B. In addition, the static combs 4 are installed in a lower portion or an upper portion of the moving combs 3 as illustrated in FIG. 2 and the comb-fingers of the static combs 4 are arranged to respectively alternate with the comb-fingers of the moving combs 3.

As illustrated in FIG. 2, when first and second comb-fingers 3a and 3b of the moving combs 3 are negatively charged (−), and first comb-fingers 4a of the static combs 4 are positively charged (+), an electrostatic force is generated between the first comb-fingers 3a of the moving combs 3 and the first comb-fingers 4a of the static combs 4, and thus the mirror unit 1 is rotationally driven, as shown with the dotted line in FIG. 2, around a spring unit 2. When second comb-fingers 4b of the static combs 4 are positively charged (+), the mirror unit 1 is rotationally driven in the opposite direction. Due to the rotational driving of the mirror unit 1, incident light is continuously and uniformly reflected in a predetermined range to scan a scanning surface.

A driving speed of a micro mirror is related to the resolution of a display device, and a driving angle is related to a screen size. That is, as the driving speed of a micro mirror increases, the resolution becomes high. As the driving angle increases, the screen size increases. Accordingly, a laser TV with a large screen and high resolution should have a light scanner, that is, a micro mirror, which is rapidly driven and has a large driving angle.

The driving speed of the micro mirror is inversely proportional to the driving angle, and thus it is difficult to obtain both a rapid driving speed of the micro mirror and a large driving angle. Meanwhile, to increase the driving speed of the micro mirror, resonant driving can be used. However, it is difficult to match the inherent frequency of the micro mirror to the driving frequency due to manufacturing errors, and thus manufacturing yield of the micro mirror is low. In addition, an additional tuning structure for adjusting the frequency may be required.

The micro mirror of FIG. 1A has moving combs 3 on sides of the mirror unit 1. In this structure, the distance $D_1$ from a rotation center of the mirror unit 1 is large, and thus the magnitude of a rotational moment is large compared with the micro mirror of FIG. 1B when the same number of the moving combs 3 is used. However, the number of the moving combs 3 is limited. In addition, when a large number of the moving combs 3 is formed, the size of the mirror unit 1 increases, thereby increasing the moment of inertia and decreasing the inherent frequency of the micro mirror, and thus, a rapid driving speed cannot be obtained.

The micro mirror of FIG. 1B has the moving combs 3 formed along spring units 2 and 2'. In this structure, the number of the moving combs 3 can be increased, thereby decreasing the magnitude of moment of inertia, compared with the structure of FIG. 1A. However, the distance $D_2$ from the center axis is short so that a small moment is generated, and thus a sufficient driving angle is not obtained. In addition, elastic coefficients of the spring units 2 and 2' may not be the same due to a processing error.

Since the conventional micro mirror does not have both a rapid driving speed and a large driving angle, it is not suitable for use in a light scanner for a laser TV having a large size and high resolution.

SUMMARY OF THE INVENTION

The present invention provides a rotational micro mirror having an improved structure to decrease the moment of inertia and increase the rotational moment, thereby providing a large driving angle.

The present invention also provides an improved structure of the rotational micro mirror, which decreases the moment of inertia and increases the rotational moment, and minimizes deformation due to the rapid operation of the micro mirror so that a display device having the rotational micro mirror provides improved images.

According to an aspect of the present invention, there is provided a rotational micro mirror including: a substrate; a reflection plate which is rotatable and reflects light; a pair of torsion springs which support opposite ends of the reflection plate so that the reflection plate is raised from the substrate, and acting as a rotation axis when the reflection plate is rotationally driven; a pair of frames which are connected to the reflection plate without connecting to the torsion springs and are symmetrically formed with respect to the torsion springs; frame supporting units which connect the reflection plate and the frames; and a driving unit including moving combs disposed on the frames and static combs disposed on the substrate and respectively corresponding to the moving combs in order to generate an electrostatic force.

The reflection plate may have a circular shape with a minimum area for light reflection, but the present invention is not limited thereto.

The pair of torsion springs may be installed so that the rotation axis of the reflection plate passes through the center of volume of the reflection plate, and are twisted when the reflection plate is rotationally driven. The cross-sectional areas of the torsion springs may be different from one another. In addition, in the torsion springs, the cross-sectional areas of portions which are more distant from the reflection plate. The different cross-sectional areas can prevent stress concentration on contact portions of the reflection plate and the torsion springs when the reflection plate is rotationally driven.

The frame supporting units may connect contact portions of the reflection plate and the torsion springs with the frames. At least four frame supporting units may be used.

The frames may have a curved shape surrounding the circumference of the reflection plate.

The moving combs include a plurality of comb-fingers arranged on the outer circumference of the frame. In addition, the comb-fingers of the moving combs may be formed perpendicular to the rotation axis of the reflection plate, but the present invention is not limited thereto.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF ILLUSTRATIVE, NON-LIMITING EMBODIMENTS OF THE INVENTION

Hereinafter, the present invention will be described more fully with reference to the accompanying drawings, in which exemplary embodiments of the invention are shown.

Figure 1A:
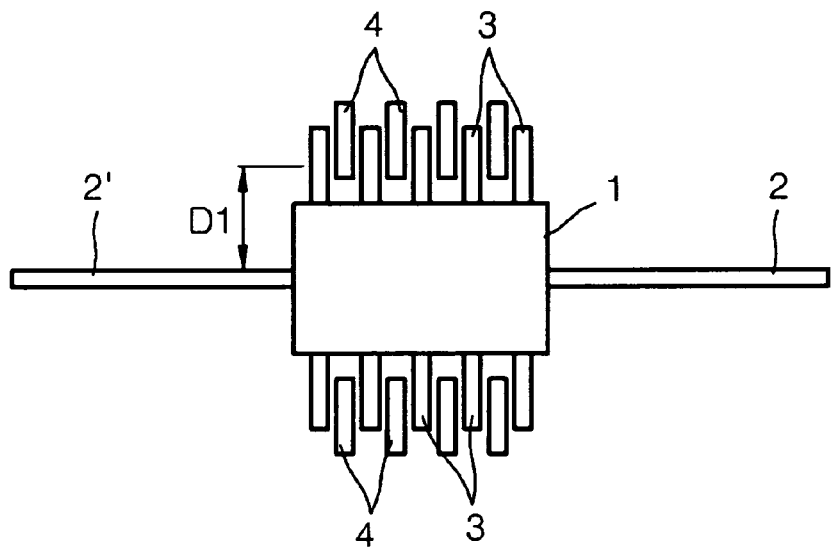
FIGS. 1A and 1B are plan views of conventional micro mirrors.
Figure 1B:
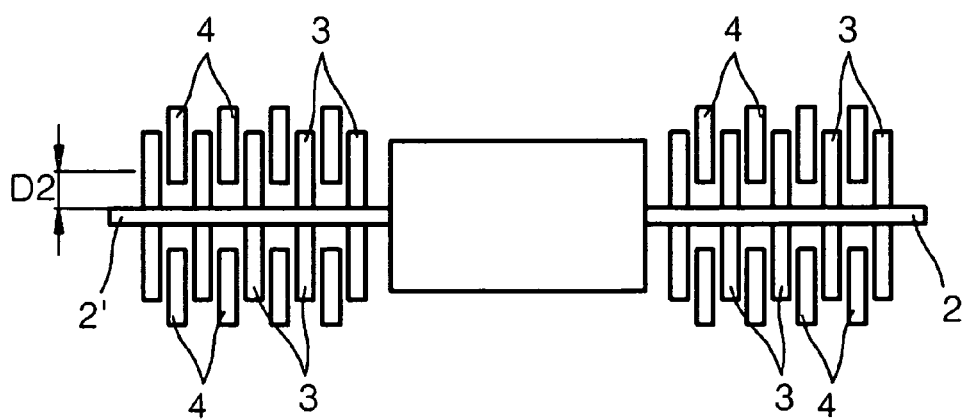
Figure 2:
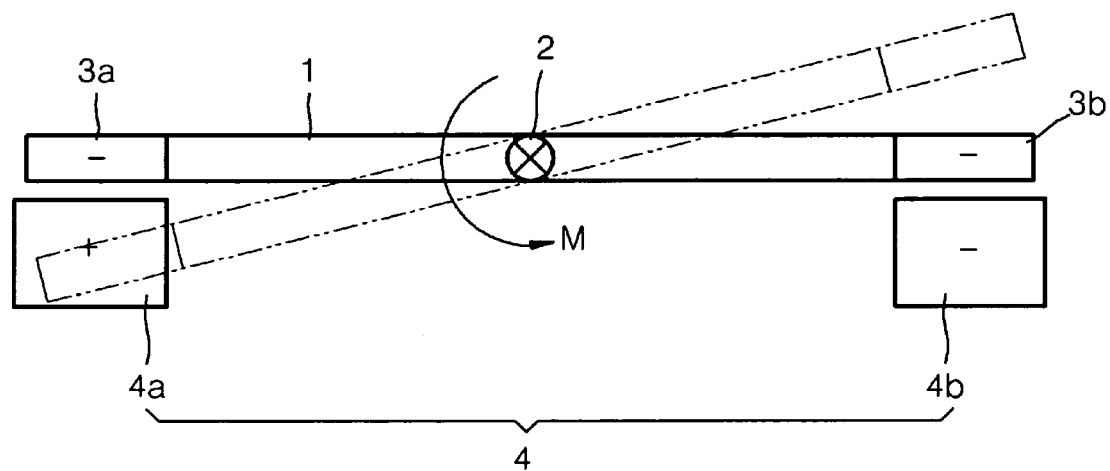
FIG. 2 illustrates the operation of the micro mirrors of FIGS. 1A and 1B.
Figure 3:
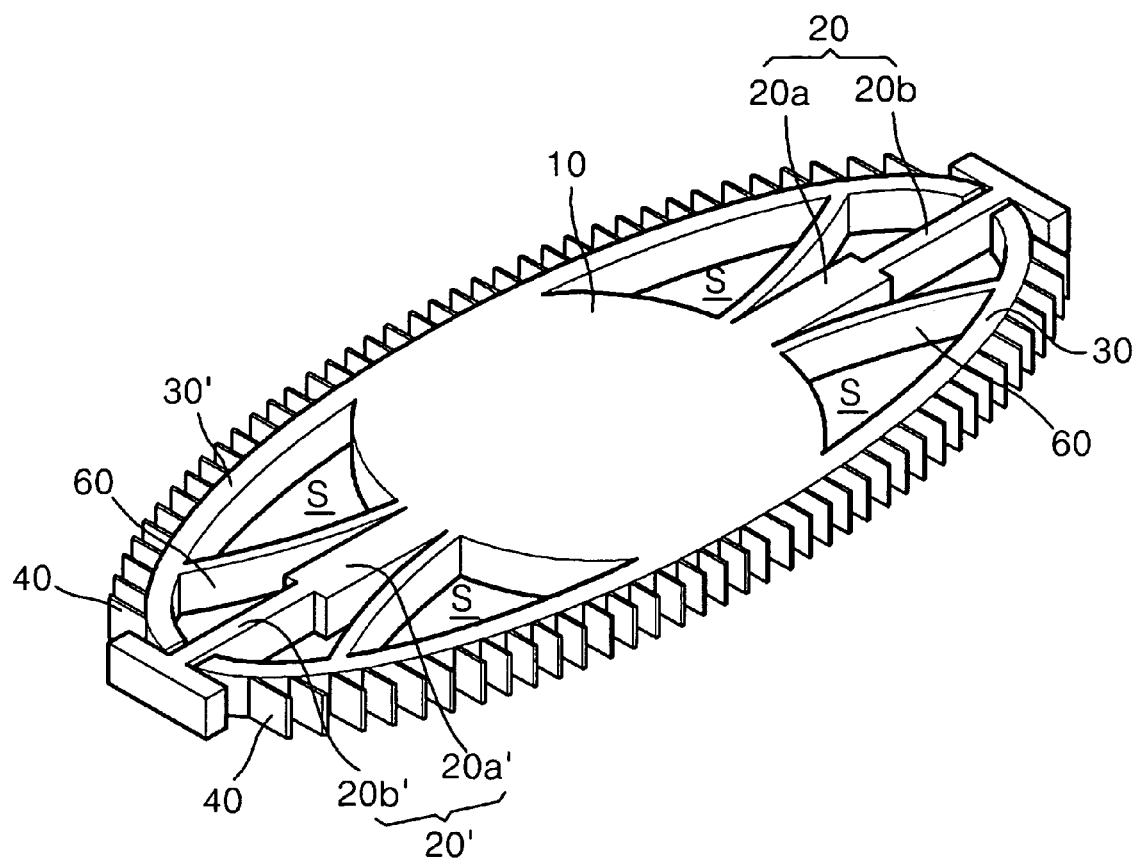
FIG. 3 is a perspective view illustrating the configuration of a micro mirror according to an exemplary embodiment of the present invention.
Figure 4:
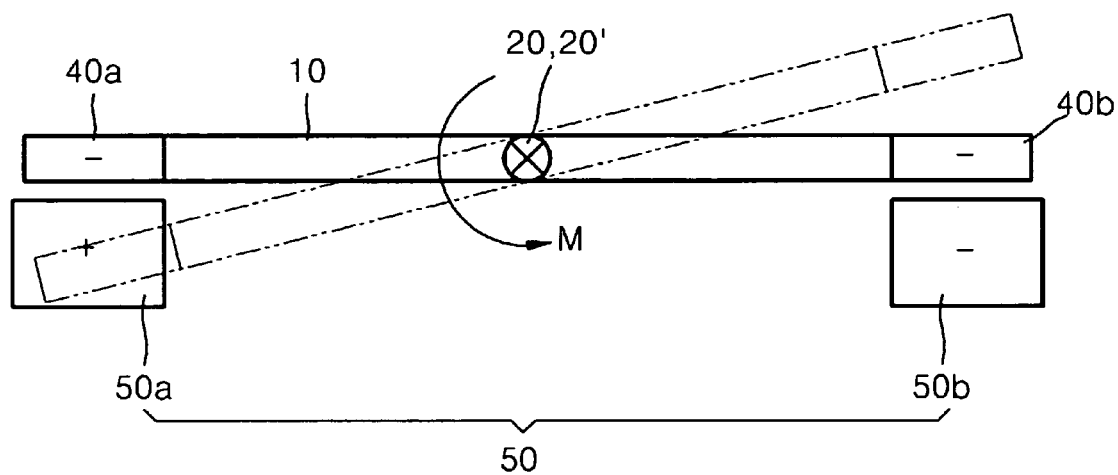
FIG. 4 illustrates the operation of the micro mirror of FIG. 3.

FIG. 3 is a perspective view illustrating a configuration of a rotational micro mirror according to an exemplary embodiment of the present invention. FIG. 4 illustrates the operation of the rotational micro mirror of FIG. 3.

In the rotational micro mirror of FIG. 3, a reflection plate 10 for reflecting light has a circular shape with a minimum area for light reflection. The reflection plate 10 is not limited to the circular shape illustrated in FIG. 3, but the circular shape is desirable because the moment of inertia does not increase too much in this case. The radius of the reflection plate 10 can be adjusted according to the light to be used.

The reflection plate 10 is rotationally driven within a predetermined angle using a pair of torsion springs 20 and 20' as a central axis. The pair of torsion springs 20 and 20' support the reflection plate 10. When the reflection plate 10 is rotationally driven, the reflection plate 10 is twisted. The torsion springs 20 and 20' should be installed so that the rotation axis of the reflection plate 10 passes through the center of volume of the reflection plate 10, and thus the reflection plate 10 is not initially bent and the micro mirror operates stably when it is rotationally driven. In FIG. 3, the cross-sectional areas of the torsion springs 20 and 20' are different from one another. That is, in the torsion springs 20 and 20', the cross-sectional areas of first portions 20a and 20a' which are close to the reflection plate 10 are larger than those of second portions 20b and 20b' which are more distant from the reflection plate 10. The different cross-sectional areas can prevent stress concentration on contact portions of the reflection plate 10 and the torsion springs 20 and 20' when the reflection plate 10 is rotationally driven. However, the different cross-sectional areas of the torsion springs 20 and 20' may not be required.

The pair of frames 30 and 30' have curve shapes surrounding the reflection plate 10, and are symmetrical with respect to the torsion springs 20 and 20'. The pair of frames 30 and 30' are not directly connected to the torsion springs 20 and 20', but are connected via both sides of the reflection plate 10 and frame supporting units 60 protruding from the reflection plate 10. The frames 30 and 30' support moving combs 40 and transfer a driving force to the reflection plate 10, the driving force being caused by an electrostatic force and transferred from static combs 50 (see FIG. 4) to the moving combs 40. In addition, portions of the frames 30 and 30' circumscribe portions of the outer circumference of the circular reflection plate 10 so that predetermined spaces S are formed between uncontacted portions of the outer circumference of the reflection plate 10 and the frames 30 and 30'. The spaces S improve an airflow to rotationally drive the reflection plate 10 smoothly.

The frame supporting units 60 protrude from the contact portions of the reflection plate 10 and the torsion springs 20 and 20', connect the contact portions with the inner circumference of the frames 30 and 30', and support the frames 30 and 30', thereby providing structural stability. In FIG. 3, two frame supporting units 60 are formed in each of the frames 30, but the present invention is not limited thereto. For example, more than four frame supporting units may be formed in a single frame.

The moving combs 40 include a plurality of comb-fingers. As illustrated in FIG. 3, the plurality of comb-fingers of the moving combs 40 are arranged on the outer circumferences of the frames 30 and 30' with a predetermined interval. Accordingly, compared with the conventional structure, the structure according to the present embodiment can have the moving combs 40 including more comb-fingers, but the size of a reflection plate 10, which affects the moment of inertia, decreases.

The static combs 50 also include a plurality of comb-fingers. The plurality of comb-fingers of the static combs 50 are arranged in a lower portion of the moving combs 40, as illustrated in FIG. 4, and fixed on a substrate (not illustrated). The comb-fingers of the moving combs 40 are arranged to respectively alternate with the comb-fingers of the static combs 50.

In the rotational micro mirror of the present embodiment, an electrostatic force acts on the moving combs 40 formed in the frames 30 and 30' and the static combs 50 (including comb-fingers 50a and 50b) formed to alternate with the moving combs 40, as illustrated in FIG. 4. The electrostatic force induces a rotational force to move the moving combs 40 around the torsion springs 20 and 20' of the reflection plate 10. That is, first and second comb-fingers 40a and 40b of the moving combs 40 are, for example, negatively charged (−), and first comb-fingers 50a of the static combs 50 are positively charged (+), and then an electrostatic force is generated between the first comb-fingers 40a of the moving combs 40 and the first comb-fingers 50a of the static combs 50. Then, the reflection plate 10 rotates around torsion springs 20 and 20'. When a voltage is applied to the static combs 50 with a regular driving frequency, the reflection plate 10 repeatedly rotates with the driving frequency.

According to the present invention, there is provided a micro mirror having a structure to decrease the moment of inertia and increase the rotational moment.

Consistent with the present invention, there is also provided an improved structure of the rotational micro mirror, which decreases the moment of inertia and increases the rotational moment, and minimizes deformation due to the rapid operation of the micro mirror so that a laser display device having a rotational micro mirror can display high resolution images.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A rotational micro mirror comprising:
    a substrate;
    a reflection plate which is rotatable and reflects light;
    a pair of torsion springs which support opposite ends of the reflection plate so that the reflection plate is raised from the substrate, and acting as a rotation axis when the reflection plate is rotationally driven;
    a pair of frames which are connected to the reflection plate without connecting to the torsion springs and are symmetrically formed with respect to the torsion springs;
    frame supporting units which connect the reflection plate and the frames; and
    a driving unit comprising moving combs disposed on the frames and static combs disposed on the substrate and respectively corresponding to the moving combs in order to generate an electrostatic force.

2. The rotational micro mirror of claim 1, wherein the reflection plate has a circular shape.

3. The rotational micro mirror of claim 1, wherein the pair of torsion springs are installed so that the rotation axis of the reflection plate passes through the center of volume of the reflection plate.

4. The rotational micro mirror of claim 1, wherein the cross-sectional areas of the torsion springs are different from one another.

5. The rotational micro mirror of claim 4, wherein, in the torsion springs, the cross-sectional areas of first portions which are close to the reflection plate are larger than those of second portions which are more distant from the reflection plate.

6. The rotational micro mirror of claim 1, wherein the frame supporting units connect contact portions of the reflection plate and the torsion springs with inner circumferences of the frames.

7. The rotational micro mirror of claim 6, wherein the number of the frame supporting units is at least four.

8. The rotational micro mirror of claim 1, wherein the frames have curved shapes surrounding the circumference of the reflection plate.

9. The rotational micro mirror of claim 1, wherein the moving combs comprise a plurality of comb-fingers arranged on outer circumferences of the frames.

10. The rotational micro mirror of claim 9, wherein the plurality of comb-fingers of the moving combs formed on the outer circumferences of the frames are formed perpendicular to the rotation axis of the reflection plate.

11. The rotational micro mirror of claim 1, wherein the pair of frames are not connected to the reflection plate through the torsion springs.

12. The rotational micro mirror of claim 1, wherein the cross-sectional areas of the torsion springs vary over the lengths of the torsion springs.

13. A rotational micro mirror comprising:
    a substrate;
    a reflection plate which is rotatable and reflects light;
    a pair of torsion springs which support opposite ends of the reflection plate so that the reflection plate is raised from the substrate, and acting as a rotation axis when the reflection plate is rotationally driven;
    a pair of frames which are connected to the reflection plate in a manner other than through the torsion springs; and
    a driving unit comprising moving combs disposed on the frames and static combs disposed on the substrate and respectively corresponding to the moving combs in order to generate an electrostatic force.

14. The rotational micro mirror of claim 13, wherein the pair of frames are connected to the reflection plate at least one of directly and through frame supporting units.

* * * * *